Nov. 9, 1948.  J. I. SLOAN  2,453,465
APPARATUS FOR MIXING DRILLING MUD
Filed Nov. 16, 1945  2 Sheets-Sheet 1
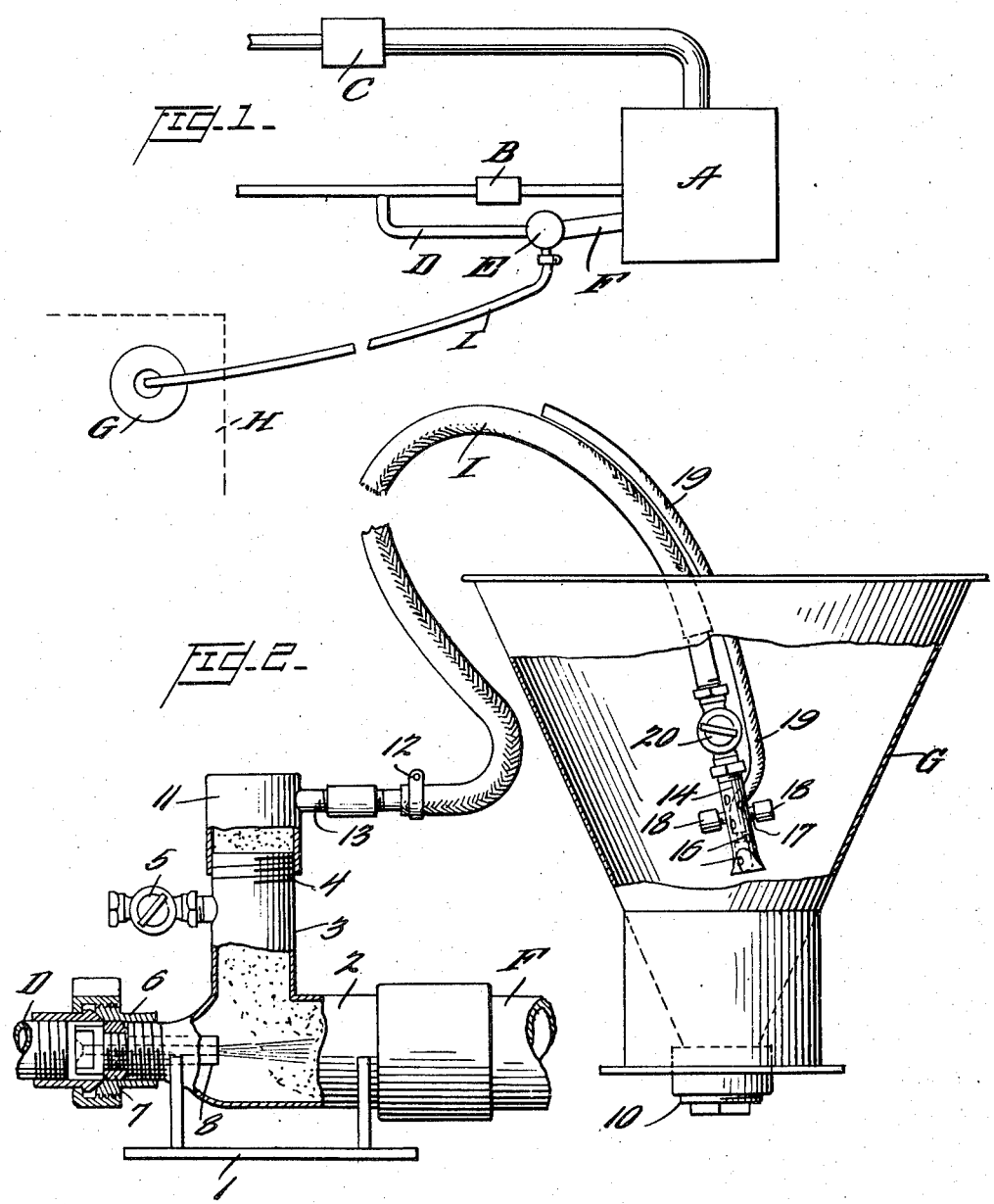
Inventor
John I. Sloan,
By Howard R. Eckston,
Attorney Nov. 9, 1948.  J. I. SLOAN  2,453,465
APPARATUS FOR MIXING DRILLING MUD
Filed Nov. 16, 1945  2 Sheets-Sheet 2
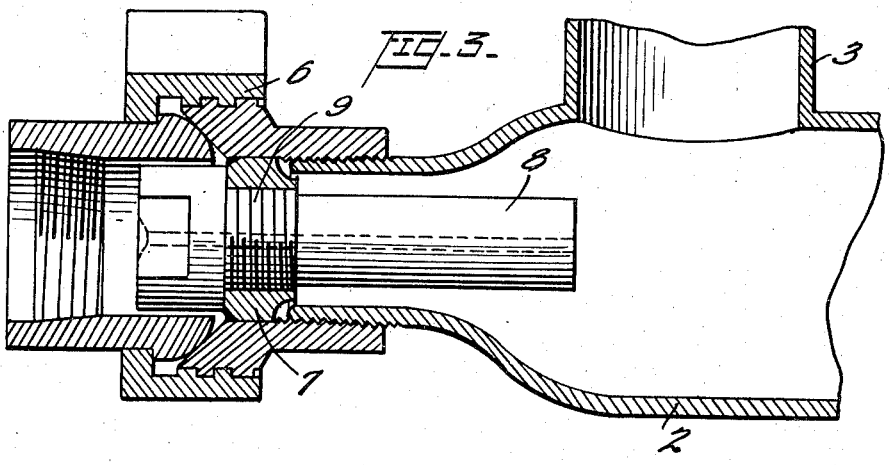
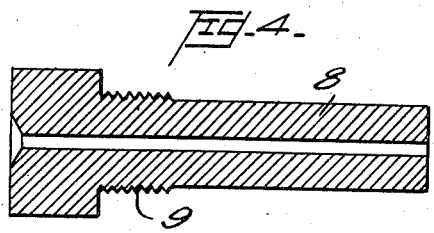
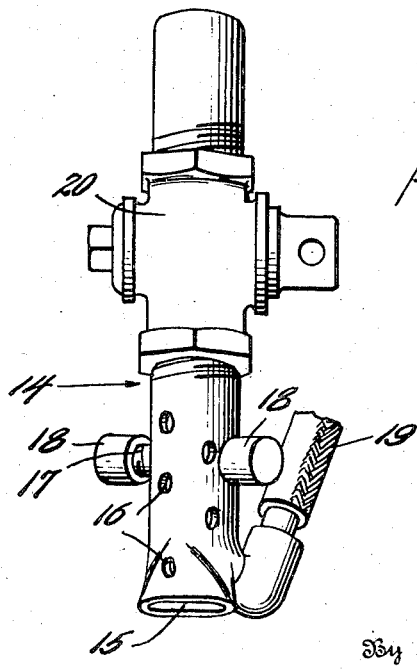
Inventor
John I. Sloan,
By
Howard R. Eccleston.
Attorney Patented Nov. 9, 1948

2,453,465

UNITED STATES PATENT OFFICE 2,453,465

APPARATUS FOR MIXING DRILLING MUD

John I. Sloan, Tulsa, Okla., assignor of one-fifth to John H. Poe, Tulsa, Okla.

Application November 16, 1945, Serial No. 629,089

11 Claims. (Cl. 259—4)

The invention relates to improved means for mixing the desired ingredients with drilling mud.

In the drilling of oil wells by rotary drilling rigs it is the common and well known practice to circulate under pressure drilling mud or fluid. This mud laden drilling fluid is pumped from a pit to the well and down through the drill stem and out through the bit. It rises to the surface and is returned in the circuit to the pit after passing through a shale separator.

This drilling performs several well known functions, but one of its main functions is the carrying away of the cuttings. The drilling mud should be of a certain desired viscosity and should meet various other well known requirements. But in the continuous circulation of the drilling mud it deteriorates and its viscosity increases, mainly because of the fact that part of the cuttings become so thoroughly mixed with the drilling mud that it does not separate in the settling pit.

It is a well known practice to add certain chemicals to the drilling mud to maintain it in proper working condition and at the desired viscosity. The present invention is concerned with a new and improved apparatus for adding and mixing the desired chemicals with the drilling mud In my pending application Serial No. 566,736, filed December 5, 1944, now Patent No. 2,423,801, dated July 8, 1947, I have disclosed an apparatus for this purpose in which the apparatus is operated entirely by vacuum created by the passage of the drilling mud, in which the degree of vacuum can be regulated by the controlled admission of air, and in which the mixing apparatus is so positioned in the circuit that the vacuum is created by the drilling mud flowing under pressure from the main circulating pump, thereby avoiding the necessity for any additional pump.

The apparatus of the present invention includes the above mentioned and other features of my said prior application, and the present application is a continuation-in-part as to all which is common to the two applications.

The present invention involves important improvements in my prior invention, and one of the objects of the present invention is to provide means by which the powdered chemical ingredients can be delivered to the mixing point from a very considerable distance, by the same vacuum which operates the mixing apparatus, and thereby permitting the container of the ingredients to remain in the tool house or wherever else it may be stored, and avoiding the necessity of transporting the container from the point of storage to the point where the mixing apparatus is located.

Another object of the invention is to provide means by which the same container of the ingredients can be mounted directly on the mixing apparatus in circumstances when that is desirable.

A further object of the invention is to provide means by which the volume of ingredients delivered to the mixing apparatus can be regulated with precision.

Various other objects and advantages of the invention will be apparent to those skilled in the art from the following detailed description when taken in connection with the accompanying drawings, in which:

Figure 1 is a diagrammatic view of the circulation system, and also showing the ingredient container or hopper located at a distance from the mixing apparatus;

Figure 2 is an elevational view of the complete apparatus, with the hopper located at a distance from the mixing apparatus, and parts being broken away for better illustration;

Figure 3 is a vertical sectional view of a portion of the mixing apparatus;

Figure 4 is a detail longitudinal sectional view of the nipple; and

Figure 5 is a perspective view of the suction head.

Referring to the drawings in more detail, and particularly to Figure 1, reference character A indicates the usual settling pit from which the drilling mud is pumped under high pressure to the well by a pump B. In completing the circuit the drilling fluid preferably flows through a shale separator C and thence back to the pit.

A by-pass pipe D leads from the main circulating line back toward the pit, and the mud mixer E is associated with this by-pass line. The section of the by-pass line indicated by reference character F, leading from the mixer to the pit, is preferably of somewhat greater diameter than that of the line leading from the main circuit to the mixer. This Figure 1 also illustrates diagrammatically the ingredient container G located in a tool house or other convenient point of storage, suggested by the broken lines H, together with a flexible hose or pipe line I connecting the ingredient container or hopper with the mixing apparatus; the hose or line I being broken in this figure and in Figure 2 to indicate distance.

Referring now to the mixing apparatus, best illustrated in Figures 2 and 3, it is preferably provided with a holder or base member 1, and includes a mixing chamber 2 from which extends upwardly a short pipe section 3. The upper or outer end of this pipe section is preferably threaded, as indicated by numeral 4, to provide for the attachment of means for supplying the chemical ingredients, as will appear hereinafter. This pipe section is also preferably provided with a valve 5 of any ordinary construction for controlling and regulating the admission of atmospheric air.

The right hand end of the mixing chamber 2, Figure 2, is connected with that portion of the by-pass indicated by F which leads back to the settling pit. The drilling mud is maintained in circulation by the main pump B and the mixing chamber communicates with the main line through that portion of the by-pass indicated by reference character D. The vacuum for drawing the powdered chemical ingredients into the mixing chamber is created by the flow of the drilling mud beneath the point where the pipe section 3 opens into the mixing chamber. As shown in Figures 2 and 3, a pipe union 6 is mounted on the left hand end of the mixing chamber and this union connects the mixing chamber with the by-pass portion D. Welded in one part of the pipe union is a collar 7, which is interiorly threaded, and a nipple 8, shown in longitudinal section in Figure 4, has a threaded portion 9 for engaging the threads of the collar. Thus the nipple is firmly secured in position but is easily removable. Of course the invention is not limited to any such specific structure. This nipple is of hard metal to resist the heavy wear resulting from the passage of the drilling mud at high pressure which may vary from 400 to 900 pounds. Nipples having different sizes of bores are used under different conditions.

The diameter of the bore of the nipple is very much less than the diameter of the by-pass section D and the delivery end of the nipple is positioned at or adjacent to the point where the pipe section 3 opens into the mixing chamber 2. Obviously the passage of the drilling mud under great pressure and at high speed from the delivery end of the nipple beneath the opening of the pipe section 3 will create a vacuum therein. This vacuum, if properly connected with a source of powdered chemical ingredients, will draw the ingredients into the chamber 2 where they will be thoroughly mixed in the mud stream.

As previously mentioned, the chemical ingredients can be stored wherever desired within a reasonable distance from the mixing apparatus. Of course, the container for the ingredients can be of any form desired but, for purposes of illustration, I have shown it in the form of a conical hopper G and, also for purposes of illustration, the hopper is shown in Figure 1 as located in a tool house or other place of storage, suggested by the broken lines H. Also in the specific form illustrated, the bottom of the hopper is closed by a screw-threaded removable plug 10 for a purpose which will appear hereinafter.

Referring now to Figure 2, a cap 11 is screwed on the upper end of the pipe section 3 in substantially air-tight relation therewith. The previously mentioned vacuum hose or flexible piping I is secured by means of a clamp 12 to a nipple or the like 13 extending from and communicating with the interior of the cap 11.

This hose I is of any desired length and attached to the free end thereof is a pick-up nozzle and associated parts which will now be described, reference being had to Figures 2 and 5.

The pick-up nozzle is indicated by numeral 14 and it may have an opening 15 in its end and may also be provided with a number of small openings or orifices 16. The nozzle may also be provided with laterally extending nipples 17 which may be closed by removable plugs or caps 18. It will, of course, be understood that any desired form of nozzle may be employed and that the invention is in no manner limited to the particular form shown and described.

Also attached to the nozzle, in any desired manner, is a breather hose 19 which is of sufficient length to communicate with the atmosphere when the nozzle is pushed down in the container or hopper holding the powdered chemical ingredients.

Arranged between the nozzle 14 and the vacuum hose I is a valve 20, by the adjustment of which the volume of ingredients delivered to the mixing chamber can be regulated.

No doubt the operation of the device will be fully understood from what has been said hereinbefore, but a brief description of the operation may be helpful.

The drilling mud is maintained in circulation from the pit to the well, and back through a shale separator C to the pit, by the main circulating pump B. A by-pass line leads from the main circulating line at a point beyond the pump back to the pit, and mounted in this by-pass line is the mixing apparatus.

The flow of the drilling mud through the nipple 8 under high pressure and at high speed at the mouth of the pipe section 3 creates a vacuum therein. The pick-up nozzle 14 is pushed down into the powdered chemical ingredients in the hopper or container G, which may be located wherever desired within a reasonable distance from the mixing apparatus, and the valve 20 is open to the desired extent. And of course the breather hose 19 is in communication with the atmosphere. Thus the vacuum created beneath the pipe section 3 will draw air through the breather hose and nozzle and thereby cause the nozzle to pick up the powdered ingredients and convey them through the vacuum hose I, the cap 11, and the pipe section 3 to the mixing chamber 2, whereby they will be thoroughly mixed in the rapidly flowing mud stream.

It will be noted that precision mud mixing can be obtained by the various adjustments provided. For example, one or more of the plugs or caps 18 can be removed, the valve 20 can be adjusted as desired, the valve 5 can be closed or opened to the desired extent to regulate the degree of vacuum created by the controlled admission of air, which admission of air adjacent to the mixing chamber also aids in flowing the chemical ingredients into the liquid drilling mud, resulting in the ingredients being more thoroughly mixed with the mud, and of course the volume of ingredients is also regulated by the use of nipples 8 with bores of different sizes under different conditions.

In certain conditions it is very desirable to have the container for the mixing ingredients mounted directly on the pipe section 3. As previously mentioned, the specific form of hopper illustrated has its bottom closed by a plug 10 which is removably threaded into the opening in the bottom of the hopper. I prefer to make this threaded opening of the size of the pipe section 3. Thus, when it is desired to mount the hopper on this pipe section, it is only necessary to remove the cap 11 from the pipe section, remove the plug 10 from the hopper, and then screw the hopper on the end of the pipe section by means of the threads 4.

From the foregoing description it will be apparent that I have devised an apparatus which is extremely simple and inexpensive in construction and operation. It will also be apparent that the device is operated entirely by vacuum which is created by the high pressure mud stream; that this aspirator effect is produced by a mud stream branching from the main drilling mud circuit, so that no additional pump is necessary; that the degree of vacuum created can be regulated by the controlled admission of air adjacent the mixing chamber; that the chemical ingredients can be stored in any convenient place and will be picked up by the nozzle and conveyed to the mixing chamber by reason of the vacuum created; that the volume of ingredients picked up can be precisely regulated by the various adjustments shown and described; and, finally, that the hopper for the ingredients is preferably of such construction that it can be mounted directly above the mixing chamber when conditions make that desirable.

It will be understood that various changes and modifications may be made without departing from the spirit of the invention, and all such changes and modifications are intended to be included within the scope of the appended claims.

What I claim is:

1. Apparatus for mixing powdered ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a mud mixing chamber in the by-pass line, said mixing chamber having an opening for the admission of the powdered ingredients, means for creating a vacuum at said opening, a vacuum pick-up head for insertion in the supply of powdered ingredients, an operative connection between said vacuum head and said opening, and said connection including a flexible line whereby the vacuum pick-up head may be variably positioned close to or distant from the mixing chamber, in accordance with the variable location of the supply of powdered ingredients.

2. Apparatus for mixing powdered ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a mud mixing chamber in the by-pass line, said mixing chamber having an opening for the admission of the powdered ingredients, means for creating a vacuum at said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, and valve means associated with the vacuum pick-up head for regulating the volume of ingredients conveyed to the mixing chamber.

3. Apparatus for mixing powdered ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a mud mixing chamber in the by-pass line, said mixing chamber having an opening for the admission of the powdered ingredients, means for creating a vacuum at said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, and a valve adjacent the mixing chamber to regulate the admission of air to regulate the degree of vacuum created.

4. Apparatus for mixing powdered ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a mud mixing chamber in the by-pass line, said mixing chamber having an opening for the admission of the powdered ingredients, means for creating a vacuum at said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, and a breather tube connected with the vacuum pick-up head.

5. Apparatus for mixing powdered ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a mud mixing chamber in the by-pass line, said mixing chamber having an opening for the admission of the powdered ingredients, means for creating a vacuum at said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, valve means associated with the vacuum pick-up head for regulating the volume of ingredients conveyed to the mixing chamber, and a breather tube connected with the vacuum pick-up head.

6. An apparatus for mixing powdered ingredients with drilling mud, including a mixing chamber having an opening for the admission of the powdered ingredients, a nipple leading into the mixing chamber adjacent to said opening, means for forcing mud under high pressure through said nipple to create a vacuum beneath said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients.

7. An apparatus for mixing powdered ingredients with drilling mud, including a mixing chamber having an opening for the admission of the powdered ingredients, a nipple leading into the mixing chamber adjacent to said opening, means for forcing mud under high pressure through said nipple to create a vacuum beneath said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, and a valve adjacent the mixing chamber to regulate the admission of air to regulate the degree of vacuum created.

8. An apparatus for mixing powdered ingredients with drilling mud, including a mixing chamber having an opening for the admission of the powdered ingredients, means for creating a vacuum beneath said opening by flowing mud under high pressure, a vacuum pick-up head for insertion in the supply of powdered ingredients, an operative connection between said vacuum head and said opening, said connection including a flexible line whereby the vacuum pick-up head may be variably positioned, close to or distant from the mixing chamber, in accordance with the variable location of the supply of powdered ingredients, said vacuum pick-up head having a plurality of openings, and means for varying the operative number of said openings.

9. An apparatus for mixing powdered ingredients with drilling mud, including a mixing chamber having an opening for the admission of the powdered ingredients, means for creating a vacuum beneath said opening by flowing mud under high pressure, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, and a breather tube connected with the vacuum pick-up head.

10. An apparatus for mixing powdered ingredients with drilling mud, including a mixing chamber having an opening for the admission of the powdered ingredients, a nipple leading into the mixing chamber adjacent to said opening, means for forcing mud under high pressure through said nipple to create a vacuum beneath said opening, a vacuum pick-up head for insertion in the supply of powdered ingredients, an operative connection between said vacuum head and said opening, and said connection including a flexible line whereby the vacuum pick-up head may be variably positioned, close to or distant from the mixing chamber, in accordance with the variable location of the supply of powdered ingredients, and valve means associated with the vacuum pick-up head for regulating the volume of ingredients conveyed to the mixing chamber.

11. An apparatus for mixing powdered ingredients with drilling mud, including a mixing chamber, a pipe section connected with the mixing chamber for the admission of the powdered ingredients, a nipple leading into the mixing chamber adjacent to the point where the pipe section connects with the mixing chamber, means for forcing mud under high pressure through said nipple to create a vacuum in said pipe section, a cap removably mounted on the pipe section, a hopper for the powdered ingredients, a pick-up vacuum head for insertion in the hopper, and a flexible conveyer connecting the vacuum head and said cap.

JOHN I. SLOAN.

REFERENCES CITED

The following references are of record in the file of this patent:

UNITED STATES PATENTS

| Number | Name | Date |
|---|---|---|
| 1,486,883 | Halliburton | Mar. 18, 1924 |
| 1,680,678 | Halliburton | Aug. 14, 1928 |
| 2,001,506 | Smith | May 14, 1935 |
| 2,338,174 | Garrison | Jan. 4, 1944 |
| 2,365,858 | Binkley | Dec. 26, 1944 |